United States Patent
Baek

(10) Patent No.: US 10,305,394 B2
(45) Date of Patent: May 28, 2019

(54) APPARATUS FOR SUPPLYING POWER TO SUB-MODULE OF MMC

(71) Applicant: HYOSUNG HEAVY INDUSTRIES CORPORATION, Seoul (KR)

(72) Inventor: Yo Han Baek, Seoul (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 0 days.

(21) Appl. No.: 15/738,758

(22) PCT Filed: Jun. 10, 2016

(86) PCT No.: PCT/KR2016/006219
§ 371 (c)(1),
(2) Date: Dec. 21, 2017

(87) PCT Pub. No.: WO2016/208894
PCT Pub. Date: Dec. 29, 2016

(65) Prior Publication Data
US 2018/0183353 A1   Jun. 28, 2018

(30) Foreign Application Priority Data

Jun. 22, 2015  (KR) .................. 10-2015-0088178

(51) Int. Cl.
| | |
|---|---|
| *H02M 1/32* | (2007.01) |
| *H02M 7/537* | (2006.01) |
| *H02M 1/084* | (2006.01) |
| *H02M 7/12* | (2006.01) |
| *H02M 1/08* | (2006.01) |

(Continued)

(52) U.S. Cl.
CPC ............. *H02M 7/537* (2013.01); *H02M 1/08* (2013.01); *H02M 1/084* (2013.01); *H02M 1/32* (2013.01); *H02M 1/36* (2013.01); *H02M 7/12* (2013.01); *H02M 7/483* (2013.01); *H02J 3/36* (2013.01); *H02M 2001/0048* (2013.01);
(Continued)

(58) Field of Classification Search
CPC ... H02M 2001/0048; H02M 2001/327; H02M 7/537; H02M 2007/4835; H02M 1/32; H02M 1/36; H02M 1/084; H02J 3/36
See application file for complete search history.

(56) References Cited

U.S. PATENT DOCUMENTS

| | | | |
|---|---|---|---|
| 6,449,180 B1 * | 9/2002 | Yang ..................... | H02M 1/10 363/142 |
| 2012/0147509 A1 * | 6/2012 | Mechanic .............. | H02H 9/041 361/49 |

(Continued)

FOREIGN PATENT DOCUMENTS

| | | | |
|---|---|---|---|
| JP | 07077513 A | * | 3/1995 |
| JP | 077513 B2 | | 8/1995 |

(Continued)

*Primary Examiner* — Jue Zhang
*Assistant Examiner* — Jye-June Lee
(74) *Attorney, Agent, or Firm* — Novick, Kim & Lee, PLLC; Jae Youn Kim

(57) ABSTRACT

The present invention relates to a power supply apparatus and, more particularly, to a power supply apparatus for sub-modules of a MMC (Modular Multilevel Converter), the apparatus stably supplying power to the sub-modules of the MMC connected to an HVDC (High Voltage Direct Current) system.

11 Claims, 8 Drawing Sheets

(51) Int. Cl.
*H02M 1/36* (2007.01)
*H02M 7/483* (2007.01)
*H02J 3/36* (2006.01)
*H02M 1/00* (2006.01)

(52) U.S. Cl.
CPC ............ *H02M 2001/327* (2013.01); *H02M 2007/4835* (2013.01); *Y02B 70/1491* (2013.01); *Y02E 60/60* (2013.01)

(56) References Cited

U.S. PATENT DOCUMENTS

| | | |
|---|---|---|
| 2014/0028266 A1 | 1/2014 | Demetriades |
| 2014/0362628 A1* | 12/2014 | Eckel ............... H02M 7/483 363/132 |
| 2017/0353098 A1* | 12/2017 | Baek .................. H02M 7/19 |

FOREIGN PATENT DOCUMENTS

| | | |
|---|---|---|
| JP | 2001238465 A | 8/2001 |
| JP | 2014180110 A | 9/2014 |
| KR | 1020140022374 A | 2/2014 |

* cited by examiner

APPARATUS FOR SUPPLYING POWER TO SUB-MODULE OF MMC

TECHNICAL FIELD

The present invention relates to a power supply apparatus and, more particularly, to a power supply apparatus for sub-modules of a MMC (Modular Multilevel Converter), the apparatus stably supplying power to the sub-modules of the MMC connected to an HVDC (High Voltage Direct Current) system.

BACKGROUND ART

In general, an HVDC (High Voltage Direct Current) system converts an alternating current produced at a power plant into a direct current and transmits the direct current, and reconverts the direct current into an alternating current at a power reception terminal to supply power to a load. Such an HVDC system can efficiently and economically transmit power, connect different systems, and transmit power a long distance with high efficiency by increasing a voltage.

An MMC is connected to the HVDC system to transmit power and compensate for reactive power. Such an MMC includes a plurality of sub-modules connected in series to each other. The sub-modules are very important components in the MMC and there is a need for a power supply apparatus for stably supplying power to the sub-modules under various environments.

FIG. 1 is an equivalent circuit diagram of an MMC and FIG. 2 is a circuit diagram of a power supply apparatus for sub-modules of an MMC of the related art. As well known in the art, an MMC is composed of one or more phase modules 1 and a plurality of sub-modules are connected in series to each other in each of the phase modules 1. Further, the phase modules 1 each connect a DC voltage side to positive (+) and negative (−) DC voltage bus bars P and N. The input voltage of the P-N bus bars is input to the sub-modules (SM) 10 through connection terminals X1 and X2.

A power supply apparatus 20 for sub-modules of an MMC converts and change high-voltage (about 2~3 kV) into low voltage (about 5~100V) of the P-N bus bars to sub-modules in order to supply power for operation of the sub-modules. To this end, in the power supply apparatus 20 of the related art, the input voltage of the P-N bus bars of the MMC is increased to high voltage (for example, 3 kV) from 0V and Vdc voltage is stored in a capacitor 21. While the Vdc voltage that is the input voltage of the P-N bus bars is increased from 0V to 100V, clamping voltage Vzd of a Zener diode (ZD) 23 is output to a controller 24 and, the controller 24 receiving the clamping voltage Vzd turns on a semiconductor switch 25 so that current is supplied to a transformer 26. When secondary output voltage Pcon of the transformer 26 is applied to the controller 24, the controller 26 drives the power supply apparatus 20.

However, in this case, even though the input voltage Vdc is lower than the rated voltage of the power supply apparatus 10, the power supply apparatus 20 is started, but it stops without producing normal output due to low voltage in the early stage. Starting and stopping are continuously repeated while the input voltage is increased, and are stopped only when the input voltage reaches the rated voltage. When the input voltage reaches the rated voltage and the power supply apparatus 20 produces normal output, the secondary output voltage Pcon of the transformer 26 takes charge of power for the controller 24.

As described above, according to the related art, the power supply apparatus 20 is started even though input voltage is lower than rated voltage in the early stage, but it cannot normally operate. Further, even if the input voltage keeps increasing and reaches a high-voltage level, current keeps flows to a resistor 22 and a Zener diode 23, so these devices 22 and 23 generate heat, thereby keeping generating a loss.

Accordingly, it is required in the related art to develop a power supply apparatus that can remove unnecessary operations and reduce a loss in power supply apparatuses for sub-modules of an MMC that is connected with an HVDC system.

DISCLOSURE

Technical Problem

An object of the present invention is to provide a power supply apparatus for sub-modules of an MMC connected to an HVDC system in which the timing for starting the power supply apparatus can be controlled.

Another object of the present invention is to provide a power supply apparatus for sub-modules of an MMC, the apparatus being able to remove heat generation and a loss at internal devices even if input voltage reaches a high voltage.

Another object of the present invention is to provide a power supply apparatus for sub-modules of an MMC, the apparatus being able to protect internal component by breaking a circuit even if overcurrent flows to the power supply apparatus or overheat is generated due to a short at a secondary load voltage output terminal of a transformer in the power supply apparatus.

Technical Solution

The present invention provides a power supply apparatus for sub-modules of an MMC.

The power supply apparatus for sub-modules of an MMC includes: a relay disposed between P-N bus bars of the MMC and including a break contact switch; a resistor connected in series to the relay; a TVS diode connected in series to the resistor; a Zener diode connected in series to the TVS diode; a transformer transmitting input (primary) voltage of the P-N bus bars to a secondary side; a semiconductor switch switching current flow to the transformer; a controller turning on the semiconductor switch such that current flows to the transformer when clamping voltage of the Zener diode is input; a relay driving unit receiving output voltage from a second side of the transformer and driving the break contact switch of the relay; and a circuit breaker connected in series to the relay and breaking a circuit when current flowing through the break contact switch of the relay is larger than a predetermined reference current or heat is generated by the current.

The input voltage may increase from 0V to a predetermined maximum voltage (Vmax).

The relay may be set to form a short at the break contact point in an early stage and the TVS diode may not pass supply current supplied through the break contact point before the input voltage increases and reaches a rated voltage for starting the power supply apparatus such that current does not flow to the controller.

When the input voltage increases and reaches the rated voltage, the TVD diode may pass the supply current to be supplied to the controller and, when the supply current is supplied to the controller, the controller may turn on the semiconductor switch.

When the semiconductor switch is turned on, primary voltage may be applied to the transformer by the supply current, the transformer may transmit the primary voltage to a secondary side to be output as secondary voltage, and the relay switch may receive the secondary voltage from the transformer and opens the break contact point of the relay.

After the break contact point of the relay is opened, the controller may be operated by operation power by the secondary output voltage of the transformer without receiving clamping voltage of the Zener diode.

When the break contact point of the relay is changed into a short state due to a short at the secondary side of the transformer in a normal operation state and overcurrent larger than a predetermined current flows through the break contact point, the circuit breaker may break the circuit.

The circuit breaker may include at least one of a current fuse that breaks a circuit when current over a predetermined reference value flow or a temperature fuse that breaks a circuit when heat is generated to a predetermined reference temperature by the current.

The temperature fuse may include a nonburnable and flame-retardant resistant material.

The temperature fuse may be integrated with the resistor (R).

The circuit breaker may be disposed between the TVS diode (TD) and a branch circuit to the controller or between the resistor (R) and the TVS diode (TD).

The semiconductor switch may be repeatedly turned on and off in accordance with a predetermined cycle by the controller after turned on.

Advantageous Effects

According to the power supply apparatus for sub-modules of an MMC, it is possible to control the timing of starting the power supply apparatus, depending on the intensity of input voltage, using a controller that controls starting voltage.

Further, since current flow to the resistor and the Zener diode is broken after the power supply apparatus is started and reaches a normal state, it is possible to remove a loss at the resistor and the Zener diode.

Further, since the circuit breaker breaks the circuit even if overcurrent flows of overheat is generated by high voltage due to a short at the secondary load voltage output terminal of the transformer in the poser supply apparatus, it is possible to prevent secondary damage to internal components.

MODE FOR INVENTION

Figure 1:
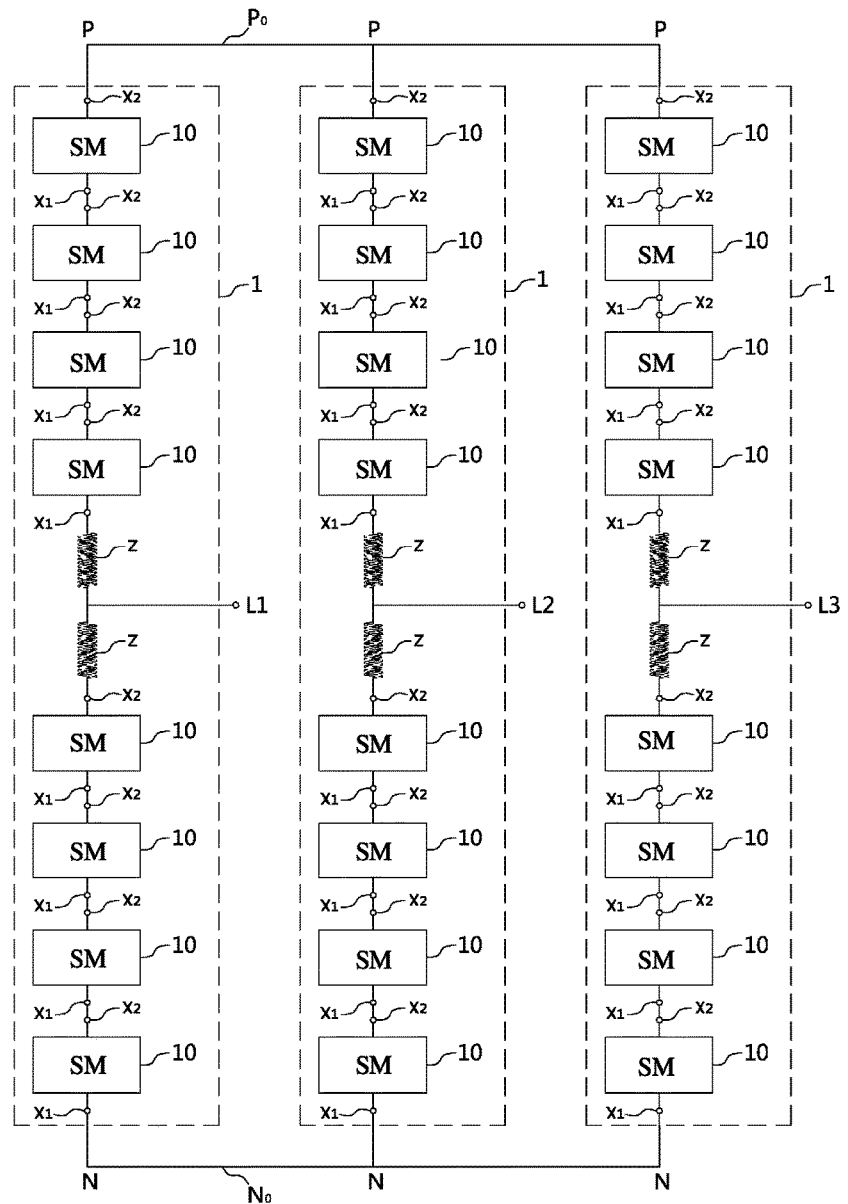
FIG. 1 is an equivalent circuit diagram of a common MMC.
Figure 2:
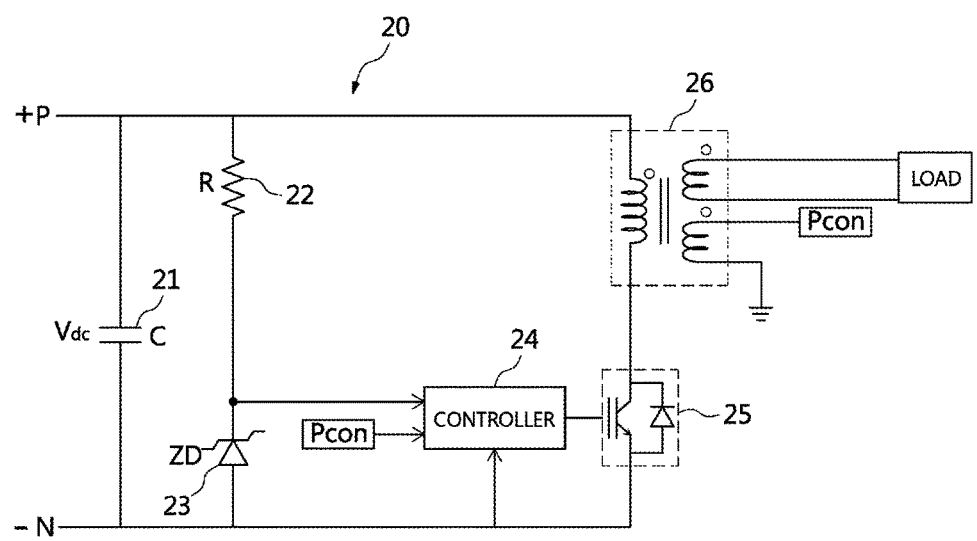
FIG. 2 is a circuit diagram of a power supply apparatus for sub-modules of an MMC of the related art.

Hereinafter, embodiments of the present invention are described in detail with reference to exemplary drawings. When components are given reference numerals in the drawings, the same components are given the same reference numerals even if they are shown in different drawings. Further, in the following description of embodiments of the present invention, when detailed description of well-known configurations or functions is determined as interfering with understanding of the embodiments of the present invention, they are not described in detail.

Further, terms 'first', 'second', 'A', 'B', '(a)', and '(b)' can be used in the following description of embodiments of the present invention. The terms are provided only for discriminating components from other components and, the essence, sequence, or order of the components are not limited by the terms. When a component is described as being "connected", "combined", or "coupled" with another component, it should be understood that the component may be connected or coupled to another component directly or with another component interposing therebetween.

Figure 3:
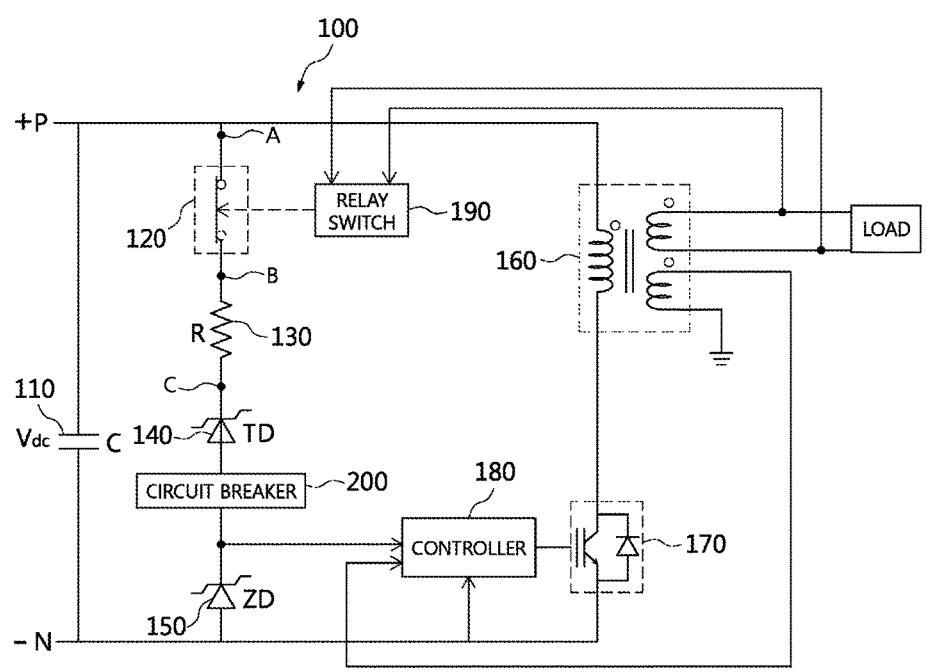
FIG. 3 is a circuit diagram of a power supply apparatus for sub-modules of an MMC according to an embodiment of the present invention.

FIG. 3 is a circuit diagram of a power supply apparatus for sub-modules of an MMC according to an embodiment of the present invention.

Referring to FIG. 3, a power supply apparatus 100 for sub-modules of an MMC (Modular Multilevel Converter) according to an embodiment of the present invention (hereafter, referred to as a 'power supply apparatus) is applied to an MMC including one or more phase modules. In detail, the apparatus supplies power to a plurality of modules constituting each of the phase modules of the MMC. To this end, the power supply apparatus 100 is started by receiving high voltage between positive (+) and negative (−) P bus bar and N bus bar connected with the phase modules, and when the apparatus produces normal output, it supplies necessary power to the sub-modules.

The power supply apparatus 100 according to this embodiment includes a charger 110, a relay 120, a resistor 130, a TVS diode (TD) 140, a Zener diode (ZC) 150, a transformer 160, a semiconductor switch 170, a controller 180, a relay switch 190, and a circuit breaker 200.

The charger 110 keeps input voltage of P-N bus bars of the MMC. The input voltage on a P-N bus bars of the MMC is stored in the charger 110 while it increases up to a predetermined maximum voltage Vmax from 0V. The charger 110, for example, may include a capacitor.

The relay 120 is connected in parallel to the charger 110. The relay 120 includes a break contact switch that forms a short in the early stage of contact. Accordingly, since the break contact switch is closed in the early stage, current flows. When voltage is applied to the relay 120 and the relay 120 is operated, the break contact switch opens and the current is broken.

The resistor 130, TVS diode 140, and Zener diode 150 are connected in series to the relay 120. The resistor 130, TVS diode 140, and Zener diode 150 may sequentially connected in series to the relay 120, but the present invention is not limited thereto. The TVS diode 140, which is a transient voltage suppressor diode, passes current only over a predetermined voltage. The Zener diode 150 allows constant clamping voltage to the supplied to the controller 180.

The transformer 160 takes the input voltage of the P-N bus bars as primary voltage and transmits the primary voltage to a secondary side. When the power supply apparatus 100 is started, the transformer 160 converts and outputs high voltage of the P-N bus bars into low voltage for a secondary load (for example, a sub-module) in accordance with the internal turn ratio. The output voltage of a secondary load voltage output terminal of the transformer 160 is input to the relay switch 190. Further, the secondary output voltage of the transformer 160 is input to the controller 180. The load output voltage that is input to the relay switch 190 and the secondary output voltage that is input to the controller 180 may be the same or different. That is, the load output voltage is negative voltage for driving a load (for example, a sub-module) and the secondary output voltage that is input to the controller 190 is voltage for driving the controller 190. When the two voltages are different, different output voltages can be achieved by forming two separate secondary coils for the transformer 160 and giving different turn ratios to the secondary coils.

The semiconductor switch 170 switches current flow such that current by the input voltage of the P-N bus bars is supplied to the transformer 160. The switching operation of the semiconductor switch 170 is controlled by the controller 180, which will be described below. When the semiconductor switch 170 is turned on, the current by the input voltage stored in the charger 110 flows through a closed circuit formed by the transformer 160 and the semiconductor switch 170 and the transformer 160 transmits the voltage at the primary side to the second side. The semiconductor switch 170 according to an embodiment of the present invention, which is a power semiconductor device that can be controlled to be turned on/off, may be implemented, for example, by an IGBT, an IGCT, a GTO, or a MOSFET.

When supply current is applied with the break contact switch forming a short in the early stage, the controller 180 turns on the semiconductor switch 170 such that the supply current flows through the semiconductor switch 170. That is, as the semiconductor switch 170 is turned on, a closed circuit including the semiconductor switch 170 is formed, so the supply current by the input voltage is supplied to the transformer 160. By this current flow, Vdc input voltage stored in the charger 110 is supplied to the primary side of the transformer 160 and the transformer 160 converts the input voltage into low voltage and transmits the low voltage to the secondary side. The secondary output voltage is input to the controller 180 and used for operation power of the power supply apparatus 100. In this embodiment, the controller 180 turns on the semiconductor switch 170 and then repeatedly controls the semiconductor switch 170 to turn on and off in accordance with a predetermined cycle. That is, the semiconductor 170 is turned on and off with a very short frequency.

The relay switch 190 operates the relay 120 by receiving load voltage output voltage that is output as load at the secondary side of the transformer 160, as described above. In detail, when the secondary output voltage of the transformer 160 is input to the relay switch 180, the break contact switch set to form a short in the early stage at the relay 120 is switched to open. Accordingly, the current flowing through the relay 120 is broken and current is not supplied any more to the controller 180. After the relay switch 190 opens the break contact switch, as described above, the controller 180 is supplied only with the secondary output voltage of the transformer 160 and the output voltage is used for the operation power of the power supply apparatus 100.

In the power supply apparatus 100 according to the present invention, as described above, the high input voltage of the P-N bus bars is stored in the charger 110 and the Vdc input voltage stored in the charger 110 which is the primary voltage of the transformer 160 is converted into secondary voltage and then used for the operation power of the power supply apparatus 100. The power supply apparatus 100 of the present invention is started only over a predetermined voltage set in the early stage, that is, the rated voltage, thereby removing unnecessary switching and minimizing a loss.

That is, according to the power supply apparatus 100 of the present invention, while the input voltage of the P-N bus bars is increased from 0V to the predetermined maximum voltage Vmax, the TVS diode 140 breaks current such that current is not supplied to the controller 180 until the input voltage reaches the rated voltage for starting the power supply apparatus 100, whereby the power supply apparatus 100 is not started. After the rated voltage is reached, the TVS diode 140 passes current such that the power supply apparatus 100 is started.

The circuit breaker 200 is connected in series to the relay 120 in the series circuit including the relay 120 and breaks the current when the current flowing through the break contact switch of the relay 120 is larger than a predetermined reference current or generates heat. That is, the circuit breaker 200 breaks the circuit when current over the reference current flows through the break contact switch of the relay 120 or when current generates heat over a predetermined temperature even if the current is not larger than the reference current in a normal operation state.

In detail, in the normal operation state, as described above, when the secondary load voltage of the transformer 160 is input, the relay switch 190 opens the break contact switch set to form a short in the early stage at the relay 120, thereby breaking the current flowing through the relay 120. However, when a short is formed at the secondary load voltage output terminal of the transformer 160 due to various causes, the secondary load output voltage of the transformer 160 to be input to the relay switch 190 becomes 0V and voltage is not applied to the relay switch 190, so the break contact switch of the relay 120 is switched into the short state from the open state. As described above, when a short is formed at the relay 120, high input voltage (about 2,600V or more) is applied to the power supply apparatus 100, so internal devices are broken due to overcurrent. In order to prevent this case, the circuit breaker 200 is connected in series to the relay 120 to protect the power supply apparatus 100 by breaking the circuit when current over the predetermined reference value flows through the relay 120 or generates heat over the reference temperature. The circuit breaker 200 may be a current fuse that breaks a circuit when overcurrent exceeding a predetermined intensity of current flows or may be a temperature fuse that breaks a current when heat at a predetermined temperature is generated. In this embodiment, the circuit breaker may be a fuse or a fusible resistor that is cut by overcurrent or overheat. This is for forming an open circuit by cutting the fuse or fusible resistor when overcurrent or overheat occurs. The temperature fuse may be a nonburnable and flame-retardant resistant material, and for example, a nonburnable metal oxide resistor (MOR) or a nonburnable wire-wound resistor (RW) may be used to be cut without burning at high temperature. In another embodiment of the present invention, a current fuse and a temperature fuse may be both used. This is for operating the current fuse in a normal state, but for operating the temperature fuse when the operation of the current fuse is delayed or failed, depending on the intensity of current due to input voltage.

As described above, since a short is formed at the secondary load voltage output terminal of the transformer in a normal state in the present invention, the circuit breaker 200 is connected in series to the relay 120 to prevent secondary damage to other devices due to overcurrent by high voltage when a short is formed at the break contact switch of the relay 120, so the circuit is opened when overcurrent is applied or heat is generated by current. In this embodiment, the circuit breaker 200 is connected in series to the relay 120 and it may be disposed at any position under the relay 120, that is, between the relay 120 and the Zener diode 150. The circuit breaker 200 is connected to the anode terminal of the TVS diodes in FIG. 3, but it may be disposed at any one of points A, B, and C indicated in FIG. 3. More preferably, the circuit breaker is disposed between the anode terminal of the TVS diode 140 and a branch circuit to the controller 180. Alternatively, in another embodiment, when the circuit breaker 200 is a temperature fuse, it may be integrated with the resistor R.

Hereafter, the operation of the power supply apparatus 100 according to the present invention is described with reference to FIGS. 4 to 7. FIGS. 4 to 7 are exemplary diagrams showing current flow according to the operation of the power supply apparatus for sub-modules of an MMC according to an embodiment of the present invention.

Figure 4:
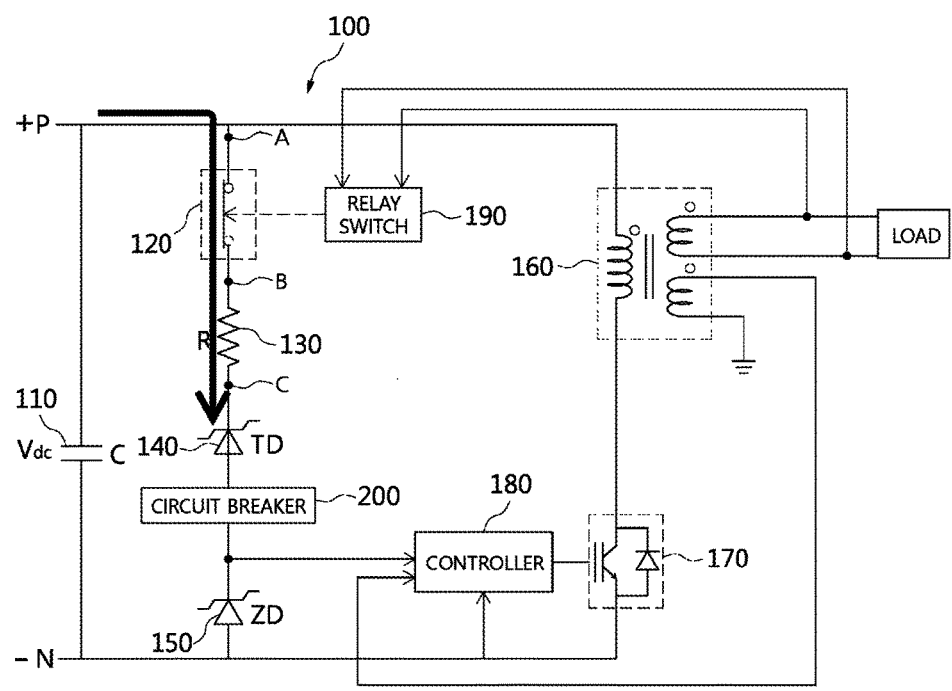
FIGS. 4 to 8 are conceptual diagrams showing current flow according to the operation of the power supply apparatus for sub-modules of an MMC according to an embodiment of the present invention.

As exemplified in FIG. 4, the input voltage of the P-N bus bars starts to increase from 0V and is stored in the charger 110. In the early state, since a short is formed at the break contact switch of the relay 120 in the early stage, supply current flows to the TVS diode 140 through the relay 120 and the resistor 130 by the input voltage. However, since the TVS diode 140 passes current only when voltage over a predetermined level is applied, and it is set to pass current only over the rated voltage for starting the power supply apparatus 100 in the embodiment, the TVS diode 140 does not pass current in a voltage range in which the input voltage is lower than the rated voltage. In FIG. 4, current does not flow to the Zener diode 150, so the voltage between both ends of the Zener diode 150 is 0 (zero) voltage and voltage is not applied to the controller 180. Accordingly, the power supply apparatus 100 is not started in this case. That is, the power supply apparatus 100 is not started before the input voltage reaches to the predetermined rated voltage from 0V.

Figure 5:
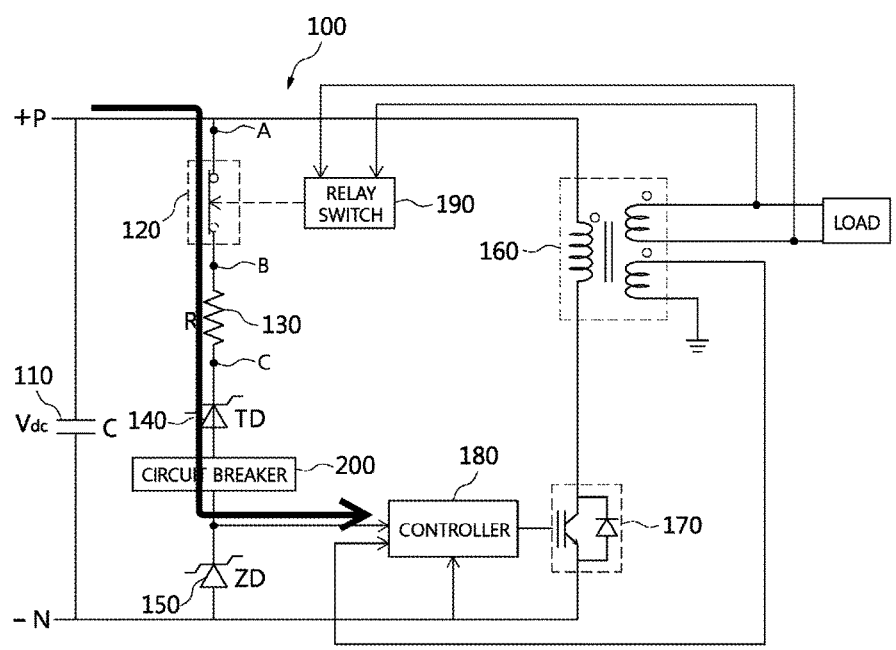

Referring to FIG. 5, when the input voltage keeps increasing and reaches the predetermined rated voltage for starting the power supply apparatus 100, the TVS diode 140 passes current, so the current flows to the controller 180 through the branch circuit. Further, as the current flows to the controller 180, the controller 180 turns on the semiconductor switch 170.

Figure 6:
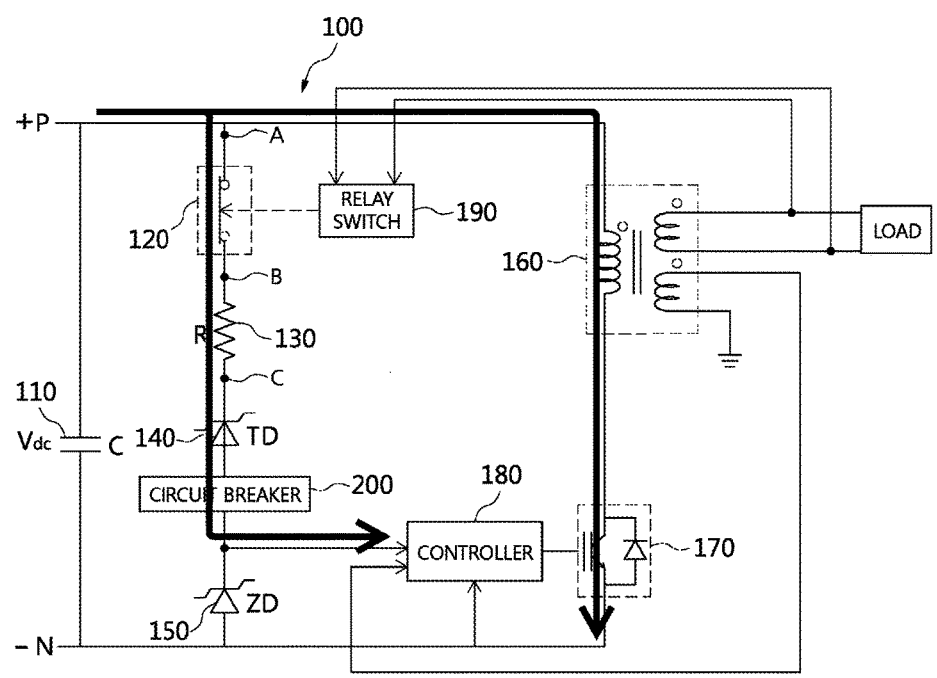

FIG. 6 shows an example in which the semiconductor switch 170 is turned on and current flows to the transformer 160. Accordingly, the power supply apparatus 100 is started and the transformer 160 transmits the voltage applied to the primary side to the secondary side. Voltage converted by the turn ratio is output at the secondary side of the transformer 160. The secondary voltage is applied to the controller 180 and the relay switch 190. The secondary voltages applied to the controller 180 and the relay switch 190 may be the same or different. If the voltages are different, it is preferable to constitute two different coils for the secondary coil to obtain different output voltages. The secondary voltage applied to the controller 180 is used for the operation power of the controller 180 and the secondary voltage applied to the relay switch 190 is used for operating the relay switch 190. As the voltage is applied to the relay switch 190, the relay switch 190 opens the break contact switch of the relay 120.

Figure 7:
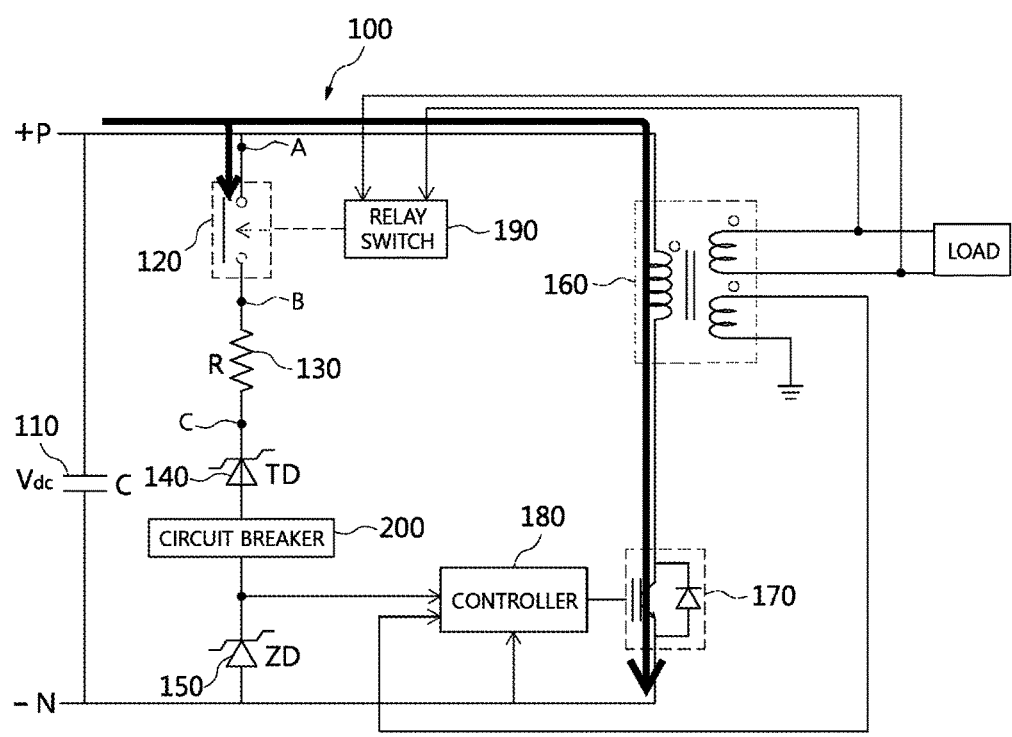

FIG. 7 shows current flow with the break contact switch of the relay 120 open. The current is broken at the relay 120 with the break contact switch open, so current does not flow any more to the controller 180, and as described with reference to FIG. 6, only the secondary output voltage of the transformer 160 is applied to the controller 180 as operation voltage of the controller 180. Accordingly, the controller 180 keeps operating the power supply apparatus 100 using the operation voltage.

Figure 8:
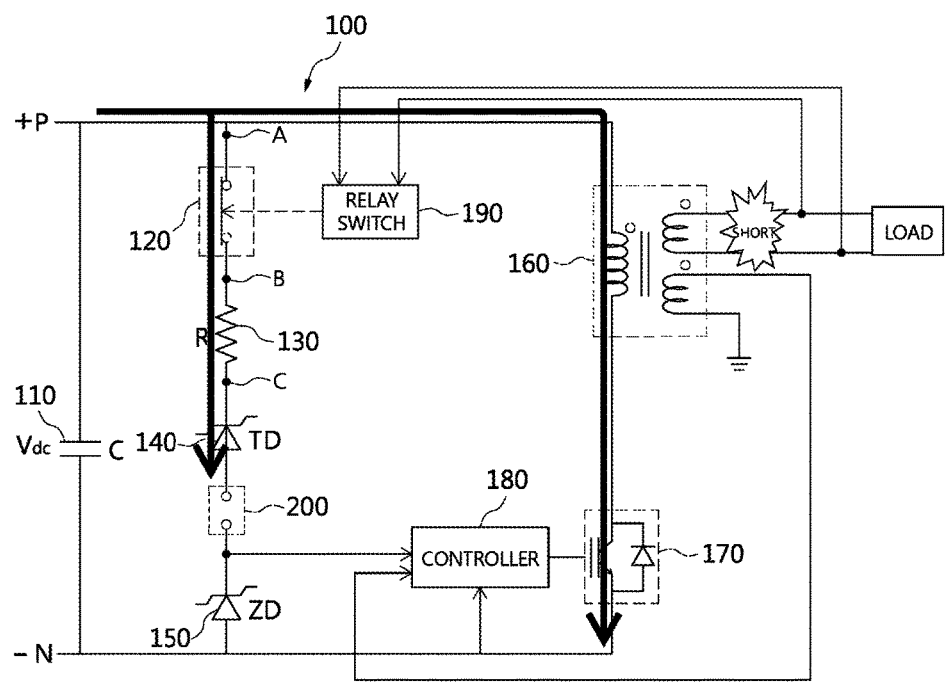

FIG. 8 shows an example in which a short is formed at the secondary load voltage output terminal of the transformer 160. When a short is formed at the secondary load voltage output terminal of the transformer 160 by any reason, voltage is not applied to the relay switch 190, so the break contact switch of the relay 120 is changed into a short state from the off-state. In this case, the input voltage of the P-N bus bars is applied through the break contact switch. Since the input voltage is high voltage, overcurrent flows through the break contact switch due to the high voltage.

As described above, when overcurrent over a predetermined reference current flows through the break contact switch or heat is generated up to a predetermined reference temperature by current flowing through the break contact switch, the circuit breaker 200 is opened to break the overcurrent. For example, when the circuit breaker 200 is a current fuse or a temperature fuse, the fuse is cut by overcurrent or heat, thereby opening the circuit. Accordingly, it is possible to prevent overcurrent due to high voltage at the input terminal from being applied to the controller 180. FIG. 8 shows an example in which the circuit breaker 200 is a fuse and the fuse is cut. In the process in which the fuse is cut is described. A current fuse is cut when overcurrent flows due to high voltage, or a temperature fuse is cut when heat is generated by current and the temperature reaches a predetermined critical temperature of the temperature fuse, thereby breaking the circuit.

As described above, in the power supply for sub-modules of an MMC according to the present invention, the power supply apparatus 100 is started only when the input voltage is over the rated voltage for staring the power supply apparatus 100, and when the power supply apparatus 100 is started and generates normal output, only the output voltage is used for operation power. Accordingly, it is possible to considerably reduce heat generation and a loss at the resistor and the Zener diode without the power supply apparatus 100 repeating starting and stopping as in the related art.

Further, in the power supply apparatus 100 according to the present invention, the circuit breaker 200 that breaks a circuit when there is overcurrent or overheat is provided to prevent damage to internal components due to overcurrent when a short occurs at the secondary output terminal of the transformer 160. Accordingly, it is possible to protect the power supply apparatus 100 even if a short occurs at the secondary output terminal of the transformer 160.

Even through all components of embodiments of the present invention are combined in one unit or operated in combination in the above description, the present invention is not limited thereto. That is, one or more of all the components may be selectively combined and operated as long as it in the objective range of the present invention. Further, the terms "comprise", "include", "have", etc. when used in this specification means that the components can exist unless specifically stated otherwise, so they should be construed as being able to further include other components. Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The above description merely explain the spirit of the present invention and the present invention may be changed and modified in various ways without departing from the spirit of the present invention by those skilled in the art. Accordingly, the embodiments described herein are provided merely not to limit, but to explain the spirit of the present invention. The patent right of the present invention should be construed by the following claims and the scope and spirit of the invention should be construed as being included in the patent right of the present invention.

The invention claimed is:

1. An apparatus for supplying power to sub-modules by using voltage charged in a charger from input voltage of P-N bus bars of an MMC (Modular Multilevel Converter), the apparatus comprising:
   a relay disposed between the P-N bus bars of the MMC and including a break contact switch;
   a resistor (R) connected in series to the relay;
   a TVS diode (TD) connected in series to the resistor;
   a Zener diode (ZD) connected in series to the TVS diode (TD);
   a transformer transmitting the input voltage of the P-N bus bars from a primary side to a secondary side thereof;
   a semiconductor switch switching a current flow to the transformer;
   a controller turning on the semiconductor switch such that the current flows to the transformer when clamping voltage of the Zener diode (ZD) is input;
   a relay switch driving the break contact switch of the relay when receiving output voltage from the secondary side of the transformer; and
   a circuit breaker connected in series to the relay and breaking a circuit when current flowing through the break contact switch of the relay is larger than a predetermined reference current,
   wherein, when the input voltage reaches a rated voltage for starting the apparatus, the controller turns on the semiconductor switch so that a closed circuit is formed by the semiconductor switch and the primary side of the transformer,
   wherein, when the semiconductor switch is turned on, the current flows in the closed circuit, and then the transformer transmits the input voltage at the primary side to the secondary side, and the output voltage from the secondary side is input to the relay switch and used as power for operating the apparatus,
   wherein the relay switch operates to open the break contact switch of the relay by using the output voltage of the secondary side so that no current is applied to the controller through the relay,
   wherein, after the break contact switch is opened, the controller receives the output voltage from the secondary side of the transformer and operates the apparatus by using the output voltage, and
   wherein, when the break contact switch of the relay is changed into a short state due to a short at the secondary side of the transformer in a normal operation state and, when current flowing through the break contact switch is larger than the predetermined reference current, the circuit breaker breaks the circuit.

2. The apparatus of claim 1, wherein the input voltage increases from 0V to a predetermined maximum voltage (Vmax).

3. The apparatus of claim 2, wherein the relay is set to form a short at the break contact switch in an early stage and the TVS diode does not pass supply current supplied through the break contact switch before the input voltage increases and reaches the rated voltage for starting the power supply apparatus such that current does not flow to the controller.

4. The apparatus of claim 3, wherein when the input voltage increases and reaches the rated voltage, the TVD diode passes the supply current to be supplied to the controller and, when the supply current is supplied to the controller, the controller turns on the semiconductor switch.

5. The apparatus of claim 4, wherein when the semiconductor switch is turned on, primary voltage is applied to the transformer by the supply current, the transformer transmits the primary voltage to the secondary side to be output as secondary voltage, and the relay switch receives the secondary output voltage from the transformer and opens the break contact switch of the relay.

6. The apparatus of claim 5, wherein after the break contact switch of the relay is opened, the controller is operated by operation power by the secondary output voltage of the transformer without receiving clamping voltage of the Zener diode.

7. The apparatus of claim 1, wherein the circuit breaker includes at least one of a current fuse that breaks the circuit when current over a predetermined reference value flows or a temperature fuse that breaks the circuit when heat is generated to a predetermined reference temperature by the current.

8. The apparatus of claim 7, wherein the temperature fuse includes a nonburnable and flame-retardant resistant material.

9. The apparatus of claim 7, wherein the temperature fuse is integrated with the resistor (R).

10. The apparatus of claim 1, wherein the circuit breaker is disposed between the TVS diode (TD) and a branch circuit to the controller or between the resistor (R) and the TVS diode (TD).

11. The apparatus of claim 1, wherein the semiconductor switch is repeatedly turned on and off in accordance with a predetermined cycle by the controller after being turned on.

* * * * *